United States Patent
Masuda

(10) Patent No.: US 9,482,865 B2
(45) Date of Patent: Nov. 1, 2016

(54) LIGHT SCANNING METHOD AND LIGHT SCANNING UNIT

(71) Applicant: Makoto Masuda, Nara (JP)

(72) Inventor: Makoto Masuda, Nara (JP)

(*) Notice: Subject to any disclaimer, the term of this patent is extended or adjusted under 35 U.S.C. 154(b) by 0 days.

(21) Appl. No.: 14/516,841

(22) Filed: Oct. 17, 2014

(65) Prior Publication Data

US 2015/0109649 A1   Apr. 23, 2015

(30) Foreign Application Priority Data

Oct. 18, 2013   (JP) .................................. 2013-217044

(51) Int. Cl.
| | | |
|---|---|---|
| G02B 26/08 | (2006.01) | |
| G02B 26/10 | (2006.01) | |
| G02B 27/30 | (2006.01) | |

(52) U.S. Cl.
CPC ............ *G02B 26/10* (2013.01); *G02B 26/0858* (2013.01); *G02B 27/30* (2013.01)

(58) Field of Classification Search
CPC ............ G02B 26/125; G02B 13/0005; G02B 26/105; G02B 26/127; G02B 26/124; G02B 26/10; G02B 26/0833; G02B 26/0841; G02B 26/085; G02B 26/0858; G02B 27/30; G02B 3/14
USPC ........................................... 359/196.1–226.2
See application file for complete search history.

(56) References Cited

U.S. PATENT DOCUMENTS

| | | |
|---|---|---|
| 2005/0057557 A1 | 3/2005 | Kobayashi et al. |
| 2008/0192323 A1* | 8/2008 | Nakamura ........... G02B 26/105 359/213.1 |

FOREIGN PATENT DOCUMENTS

| | | |
|---|---|---|
| JP | H02208788 A | 8/1990 |
| JP | H02240669 A | 9/1990 |
| JP | H0995008 A | 4/1997 |
| JP | 2005077431 A | 3/2005 |
| JP | 2008-197336 A | 8/2008 |
| JP | 2009014907 A | 1/2009 |
| JP | 2012-141265 A | 7/2012 |
| JP | 2012242719 A | 12/2012 |

OTHER PUBLICATIONS

Japanese Notice of Reasons for Rejection corresponding to Application No. 2013-217044; Mailing date of this notice: Oct. 20, 2015, with English translation.

* cited by examiner

*Primary Examiner* — James Phan
(74) *Attorney, Agent, or Firm* — Cantor Colburn LLP

(57) ABSTRACT

In a light scanning method of scanning a light beam emitted from a light source on a plane to be scanned, a focal distance of an optical element that converges light emitted from the light source onto the plane to be scanned is sequentially varied to uniform a beam spot diameter at each position on the plane to be scanned where a distance from the light source varies.

2 Claims, 8 Drawing Sheets

Raster Scanning (Horizontal:vertical Scanning Frequencies = 10:1)

Lissajous Scanning (Horizontal:vertical Scanning Frequencies = 10:9)

LIGHT SCANNING METHOD AND LIGHT SCANNING UNIT

CROSS REFERENCE TO RELATED APPLICATION

This application is based upon and claims the benefit of priority from Japanese patent application No. 2013-217044, filed on Oct. 18, 2013, the disclosure of which is incorporated herein in its entirety by reference.

TECHNICAL FIELD

The present invention relates to a light scanning method and a light scanning unit.

BACKGROUND ART

Conventionally, as a method of converging a light beam in light scanning, a method is employed which performs scanning conversion at constant speed on a plane to be scanned using an fθ lens or an arcsine lens and forms an image on the plane to be scanned.

Conventionally, a light scanning unit that scans a light beam emitted from a light source on the plane to be scanned by a light deflecting device is widely used in a writing system such as a laser printer and a reading system such as a barcode reader.

In the writing system that is required to be high definition, the light beam needs to converge to a beam diameter of about 50 µm, and thus a high-precision light scanning unit is required.

JP 2008-197336 A discloses a light scanning unit that reflects a light beam emitted from a light source by a light deflecting device composed of an oscillating mirror supported on a twisting brace, controls light projection timing of the light beam so that the scanning speed by the oscillating mirror becomes constant on the plane to be scanned, and converges the light beam on the plane to be scanned by a varifocal lens provided on the upstream side of the light deflecting device.

Further, JP 2012-141265 A discloses an apparatus that measure the distance to a plane to be scanned (object) by counting time from emission of a light beam to return back of reflected light in the case of two-dimensional scanning.

SUMMARY OF INVENTION

Technical Problem

In the light scanning unit in JP 2008-197336 A, since the scanning is performed by the oscillating mirror supported by the twisting brace, it becomes difficult to detect the position with respect to a swing angle of the oscillating mirror, it is hard to obtain a reference position of the light deflecting device, and resulting in impossibility of performing highly precise scanning (drawing) on the plane to be scanned.

In the distance measuring apparatus in JP 2012-141265 A, counting an extremely short time is required when the distance to an object to be measured is short, and therefore an emission control unit for the light beam and a time measuring unit are extremely expensive. Further, when the distance to the object is long, a high-power light source to obtain reflected light required for counting is required, causing a problem in securing safety.

The present invention has been made in consideration of the above problems, and its object is to provide a light scanning method capable of, when scanning a light beam emitted from a light source on a plane to be scanned by a light deflecting device, scanning the plane to be scanned with higher precision.

Another object of the present invention is to provide a light scanning unit for using the above-described light scanning method. Further, still another object is to provide a light scanning unit capable of, even if the distance to a plane to be scanned is different, converging a light beam with high precision on the plane to be scanned by the same unit. Furthermore, yet another object is to provide a light scanning unit that is small and lightweight and inexpensive.

Solution to Problem

The present invention is a light scanning method of scanning a light beam on a plane to be scanned, comprising the steps of: light emitting from a light source, varying a focal distance of an optical element sequentially, the optical element converges light emitted from the light source onto the plane to be scanned, to uniform a beam spot diameter at each position on the plane to be scanned where a distance from the light source varies.

The optical element includes: a first optical element that converts laser light emitted from the light source to collimated light with a predetermined light diameter; and a second optical element that varies the is focal distance of the light beam incident thereon from the first optical element, and the light beam from the second optical element is reflected off a light deflecting device and is applied to the plane to be scanned.

Further, in the light scanning method according to the present invention, the focal distance is decided by the second optical element, the light beam scanned on the plane to be scanned by the light deflecting device is sensed by a light beam sensing device, a sensed signal is used as a synchronization signal of the light deflecting device, a light quantity of the light beam scanned on the plane to be scanned by the light deflecting device or the light beam reflected off the plane to be scanned is detected, and the focal distance of the second optical element is controlled to make the light quantity of the reflected light beam have a maximum value.

A light scanning unit using the above-described light scanning method according to the present invention is a light scanning unit for scanning a light beam emitted from a light source on a plane to be scanned, the light scanning unit including: an optical element that converges light emitted from the light source onto the plane to be scanned; and a device that sequentially varies a focal distance of the optical element to uniform a beam spot diameter at each position on the plane to be scanned where a distance from the light source varies.

In the light scanning unit, the optical element includes: a first optical element that converts laser light emitted from the light source to collimated light with a predetermined light diameter; and a second optical element that varies the focal distance of the light beam incident thereon from the first optical element, and the light scanning unit further includes a light deflecting device that reflects the light beam from the second optical element and applies the light beam to the plane to be scanned.

Further, the present invention is the light scanning unit further including: a light beam sensing device that senses the light beam whose focal distance is decided by the second optical element and which is scanned on is the plane to be scanned by the light deflecting device; a light quantity detecting device that detects a light quantity of the light beam scanned on the plane to be scanned by the light deflecting device or the light beam reflected off the plane to be scanned; and a control unit that uses a sensed signal of the light beam sensing device as a synchronization signal of the light deflecting device and controls a focal distance adjusting function of the second optical element to make the light quantity of the reflected light beam detected by the light quantity detecting device have a maximum value.

In the light scanning unit, it is preferable that the first optical element is a collimator lens, the second optical element is a varifocal lens, the light deflecting device is an oscillating mirror, and the light beam reflecting device is a half mirror.

Further, in the light scanning unit, it is preferable that the oscillating mirror is a MEMS mirror manufactured by micromachining and is formed in a microminiature oscillating mirror module.

DESCRIPTION OF EMBODIMENTS

Figure 1:
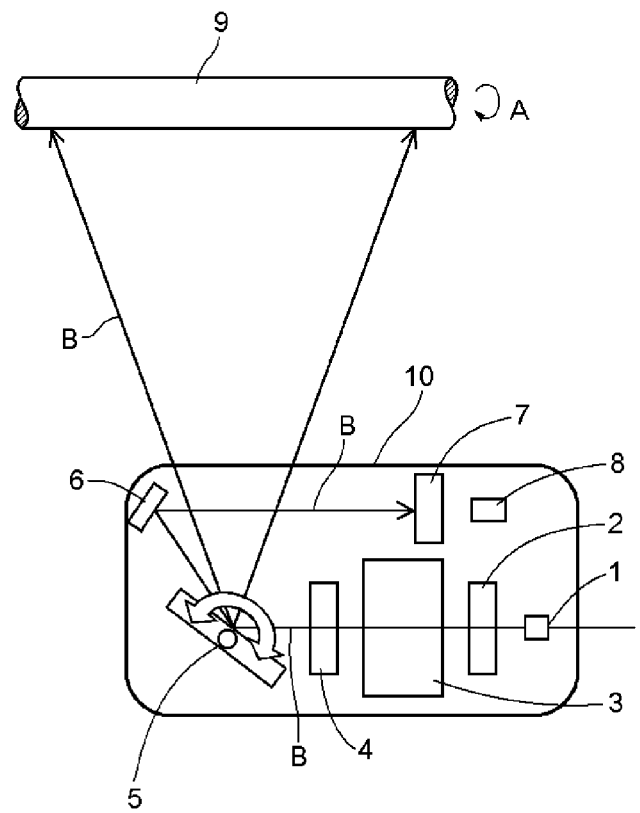
FIG. 1 is a block diagram illustrating a configuration of a light scanning unit and an optical path according to an embodiment of the present invention.

Next, an embodiment of the present invention will be described in detail referring to the drawings.

Laser Scanning Unit

FIG. 1 is a block diagram illustrating a configuration of a laser scanning unit (LSU) 10 according to the embodiment of the present invention. The laser scanning unit 10 is composed of a light source 1, a collimator lens 2 being a first optical element, a varifocal lens 3 being a second optical element, a beam diameter correction lens 4 being a third optical element, an oscillating mirror 5 being a light deflecting device, a half mirror 6 being a light beam reflecting device, a light beam sensor 7 being a light quantity detecting device, and a control unit 8. The laser scanning unit 10 emits a light beam and applies the light beam on a photosensitive drum 9 being a plane to be scanned. In FIG. 1, an optical path is indicated with a symbol B.

The light source 1 is a laser diode (semiconductor laser) or the like and emits pulsed laser light with a predetermined wavelength, for example, 780 nm based on a driving signal from a driving circuit 81 (see FIG. 8) of the control unit 8. Examples of the semiconductor laser include an edge emitting laser and a surface emitting laser both of which are usable. One kind of the surface emitting laser is a vertical cavity surface emitting laser (VCSEL) and, for example, wavelengths of 850 nm, 1310 nm, 1550 nm are used for this kind of laser.

The collimator lens 2 shapes (converts) the laser light emitted from the light source 1 to a parallel luminous flux (light beam) with a predetermined luminous flux diameter, for example, 200 μm and emits the parallel luminous flux (light beam). The collimator lens 2 is provided integrally with the light source 1, adjusted so that the laser light emitted from the light source 1 becomes collimated light, and then fixed integrally with the light source 1. In this embodiment, for eample, an F-number (focal distance) of the collimator lens 2 is set to 32 and an NA value (numerical aperture value) is set to 0.12 for darkening so as to secure beam brightness.

The varifocal lens 3 is to sequentially vary the focal distance under later-described conditions so as to uniform and minimize the beam spot diameter on the plane to be scanned of the light beam incident from the collimator lens 2. For the varifocal lens 3, an electro-optical conversion material, a method of mechanically moving the lens or the like can be used as long as it can provide a desired focal distance. For example, the varifocal lens discussed in JP 2008-197336 A can also be used. In this embodiment, the varifocal lens 3 has an inside filled with liquid, and is configured to vary in refractive index when vibration is applied to later-described piezoelectric elements 33 and is variable in focal distance by its resonant frequency. Concretely, a varifocal lens having an adjustable range of the focal distance of 250 to 300 mm and an oscillating frequency of 2.5 KHz is used.

Figure 2:
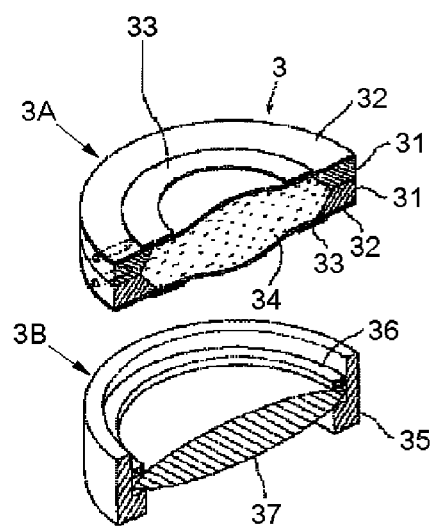
FIG. 2 is an exploded perspective view with a part broken illustrating an example of a varifocal lens for use in the light scanning unit illustrated in FIG. 1.

The varifocal lens 3 is configured such that a varifocal lens part 3A and a fixed objective lens part 3B are superposed one on the other as illustrated in FIG. 2. The varifocal lens part 3A is configured as follows, with respect to the focal distance of the fixed objective lens part 3B, so as to vary the focal distance.

Thin-film glass diaphragms 32 as light transmissive elastic films are bonded to annular silicon spacers 31, 31 respectively by anodic bonding. On the surface side of the glass diaphragms 32, the piezoelectric elements 33 as driving devices such as PZTs (Piezoelectric elements) are each formed in an annular shape by a deposition method such as sputtering. Though not illustrated, the glass diaphragm 32 is formed to have a thickness distribution such that the film thickness gradually becomes smaller as it goes to a central portion, thereby reducing an optical aberration of a light transmissive resin 34 of the varifocal lens part 3A.

The fixed objective lens part 3B is formed by fixing an fixed objective lens 37 sandwiched between an inner peripheral stepped portion of a lens holder 35 and a holding ring 36, by means of adhesive bonding or the like. Further, the above-described varifocal lens part 3A and fixed objective lens part 3B are integrated together by bonding their outer peripheral portions to each other by means of adhesive bonding or the like.

By driving the piezoelectric elements 33, the curvatures of the glass diaphragms 32 change. Then, the light transmissive resin 34, which is surrounded at its entire periphery by being surrounded in its radial direction by the silicon spacers 31, 31 and covered at surfaces in an optical axis direction by the glass diaphragms 32, changes in shape. Due to this shape change, the focal distance of the varifocal lens part 3A changes. By synchronizing the driving with the oscillation of the oscillating mirror 5, the focal distance of the light beam passing therethrough is varied.

Figure 3:
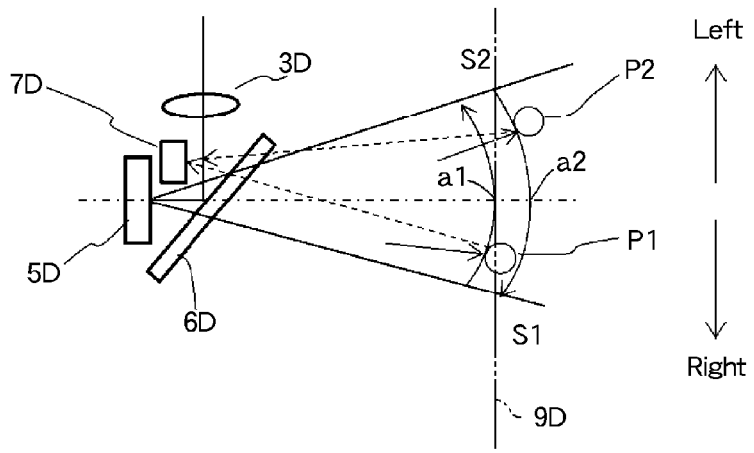
FIG. 3 is a view explaining a principle for synchronizing the varifocal lens with an oscillating mirror.

FIG. 3 is a view explaining an example for synchronizing the driving of the piezoelectric elements 33 of the varifocal lens 3 with the oscillation of the oscillating mirror 5. Note that FIG. 3 is different from the laser scanning unit 10 in FIG. 1, and is to find out how to synchronize a varifocal lens 3D with an oscillating mirror 5D. Reference numerals are the same as those of the members of the laser scanning unit 10 and therefore "D" is added to them.

The collimated light from the collimator lens 2 in FIG. 1 comes to have a minimum beam diameter at a predetermined position by the varifocal lens 3D as illustrated in FIG. 3. In this example, when a voltage of 80 V is applied to the varifocal lens 3D, the focal distance of the lens becomes shortest, and the beam diameter becomes minimum at a position of 30 cm from the varifocal lens 3D (position of a1 in the drawing). When a voltage of 75 V is applied to the varifocal lens 3D, the focal distance of the varifocal lens 3A becomes longer, and the beam diameter becomes minimum at a position of 35 cm from the varifocal lens 3D (position of a2 in the drawing). As described above, the focal distance of the varifocal lens 3D can be arbitrarily set by the voltage applied thereto.

Figure 4:
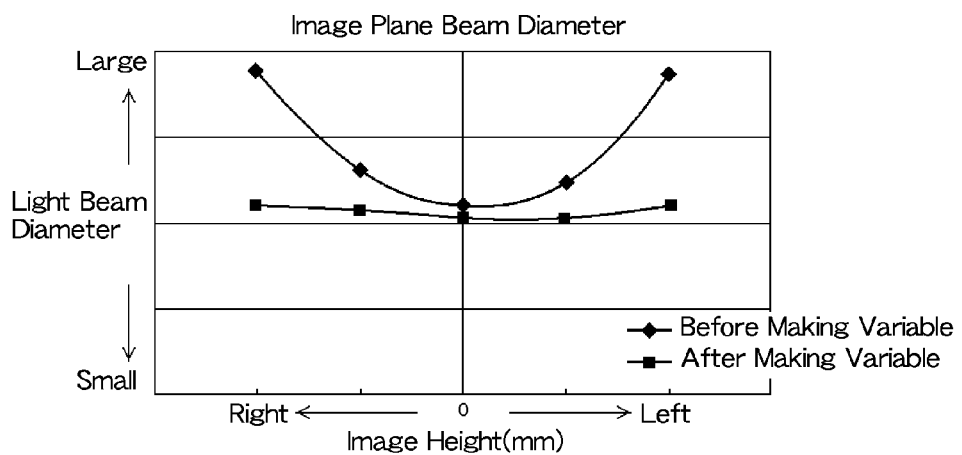
FIG. 4 is a graph illustrating changes in beam diameter before making variable and after making variable a focal distance of the varifocal lens.

For example, when the oscillating mirror 5D is oscillated without applying voltage to the varifocal lens 3D, the beam diameter becomes minimum at the center of the oscillation and becomes larger as it goes to both ends of the oscillation (see before making variable in FIG. 4). By changing is the applied voltage in accordance with the oscillation state of the oscillating mirror 5D when applying voltage to the varifocal lens 3D, any light beam diameter becomes substantially the same even if it is apart from the oscillation center (see after making variable in FIG. 4).

The beam whose focal distance is decided by the varifocal lens 3 in FIG. 1 passes through the beam diameter correction lens 4 and is reflected off the oscillating mirror 5 and scanned on the plane to be scanned, for example, the photosensitive drum 9. The beam diameter correction lens 4 has a function of reducing the risetime of the varifocal lens 3 and a function of suppressing beam width fluctuation at the oscillating mirror 5. In this embodiment, for example, the focal distance is 250 mm.

The light beam shaped into the parallel luminous flux by the collimator lens 2 is reflected off the oscillating mirror 5 being a light deflecting device and scanned toward the photosensitive drum 9. The oscillating mirror 5 is a mirror of MEMS (Micro Electro Mechanical Systems) manufactured by micromachining in a preferred embodiment of the present invention, and is formed into a microminiature oscillating mirror module.

Figure 5:
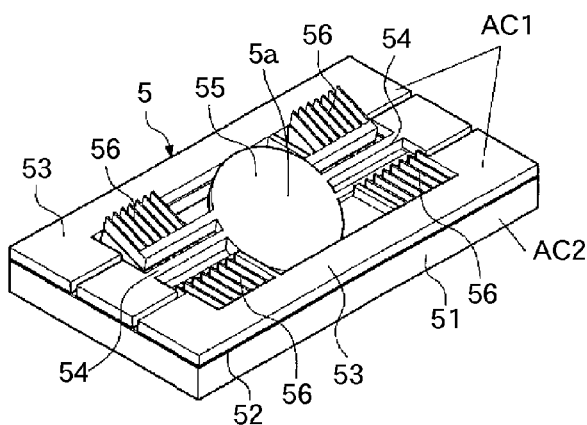
FIG. 5 is a perspective view illustrating an example of a one-dimensional scanning oscillating mirror.

In this embodiment, the oscillating mirror 5 is configured to generate rotation torque by an electrostatic driving method. The oscillating mirror 5 employing the electrostatic driving method is configured to have, as illustrated in FIG. 5, fixed electrodes 53, 53 that are provided on both sides of the upper surface of a middle plate 52 fixed to the upper surface of a lower plate 51, a movable electrode 55 that is supported between the fixed electrodes 53, 53 on both sides by twisting support members 54, and comb-shaped electrodes 56 that exist on both sides of the movable electrode 55 and between the movable electrode 55 and the fixed electrodes 53. In FIG. 5, reference numerals and symbols AC1, AC2 are given to power supply parts.

On the upper surface of the movable electrode 55, a mirror part 5a is formed by depositing a reflection member such as silver. According to the is wavelength and intensity of the laser light and reflection efficiency, the material, the thickness of deposition, and the layer configuration of deposition are appropriately decided. The fixed electrodes 53 and the movable electrode 55 are alternately arranged via gaps parallel to an electrode surface. Here, applying voltages to the electrodes makes it possible to one-dimensionally oscillate the mirror part 5a with a predetermined period by attraction force and repulsive force acting between the electrodes. Note that the period of oscillation and the oscillation width of the mirror part 5a can be set according to the applied voltage, but the oscillation frequency is preferably close to the resonant frequency of the mirror part 5a when the oscillation period of the mirror part 5a is short.

The oscillating mirror 5 used in this embodiment is preferably the one by the electrostatic driving method including a driving device and a detecting device on the axis of oscillation, and the detecting device is capable of detecting the magnitude of oscillation. The one by an electromagnetic driving method may be used, but the one by the electrostatic driving method has an advantage of low power consumption.

Figure 6A:
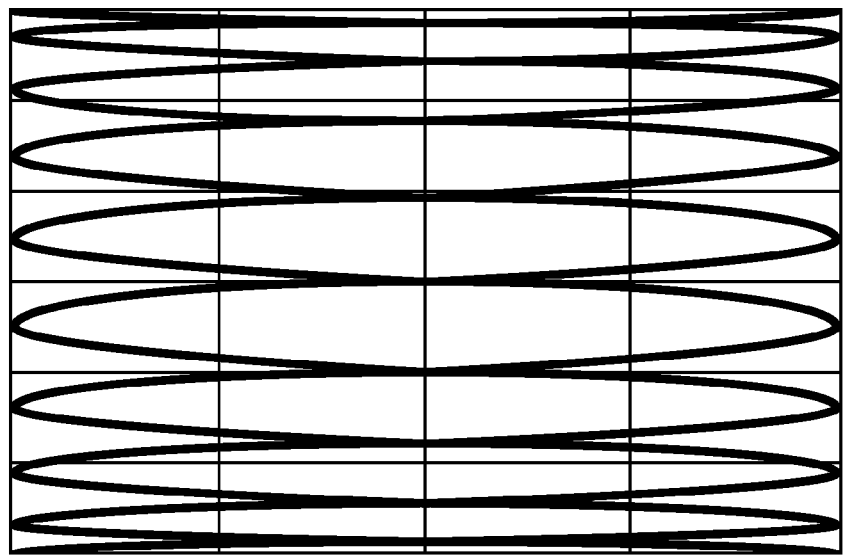
FIG. 6A is a drawing illustrating raster scanning methods by the oscillating mirror in FIG. 5.
Figure 6B:
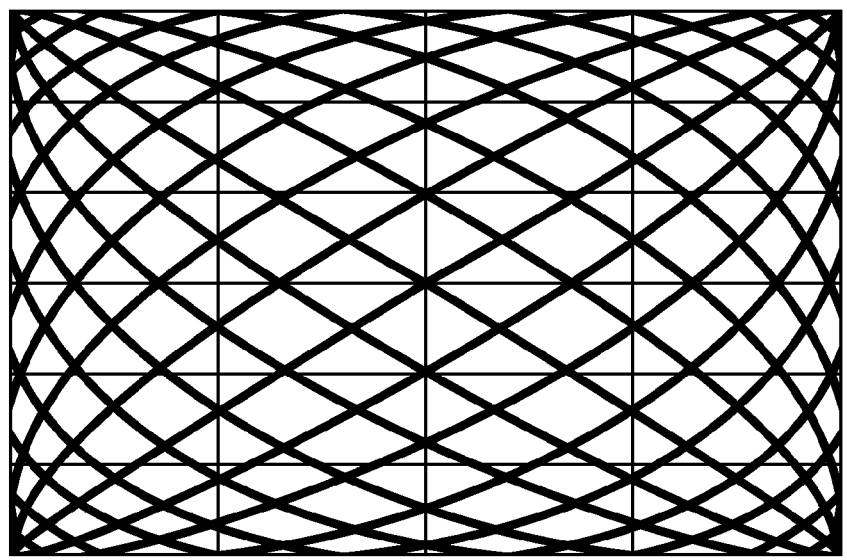
FIG. 6B is a drawing illustrating lissajous scanning methods by the oscillating mirror in FIG. 5.

In this embodiment, a voltage of 120 V at 20 kHz is applied in the main scan direction of the oscillating mirror 5 and a voltage of 50 V at 60 Hz is applied in the sub-scan direction, and a swing angle is 40 degrees in the main scan direction and 20 degrees in the sub-scan direction. The voltage applied on the electrode can be arbitrarily set not only to a sine wave, but also to a trapezoidal wave, a saw-tooth wave and the like according to the following capability of the oscillating mirror 5. Though raster scanning is performed at 20 kHz in the main scan direction and at 60 Hz in the sub-scan direction in this example, a raster scanning method using a saw-tooth wave in the sub-scan direction or a Lissajous method using a sine wave in the sub-scan direction may be performed as illustrated in FIG. 6A, 6B.

Figure 7:
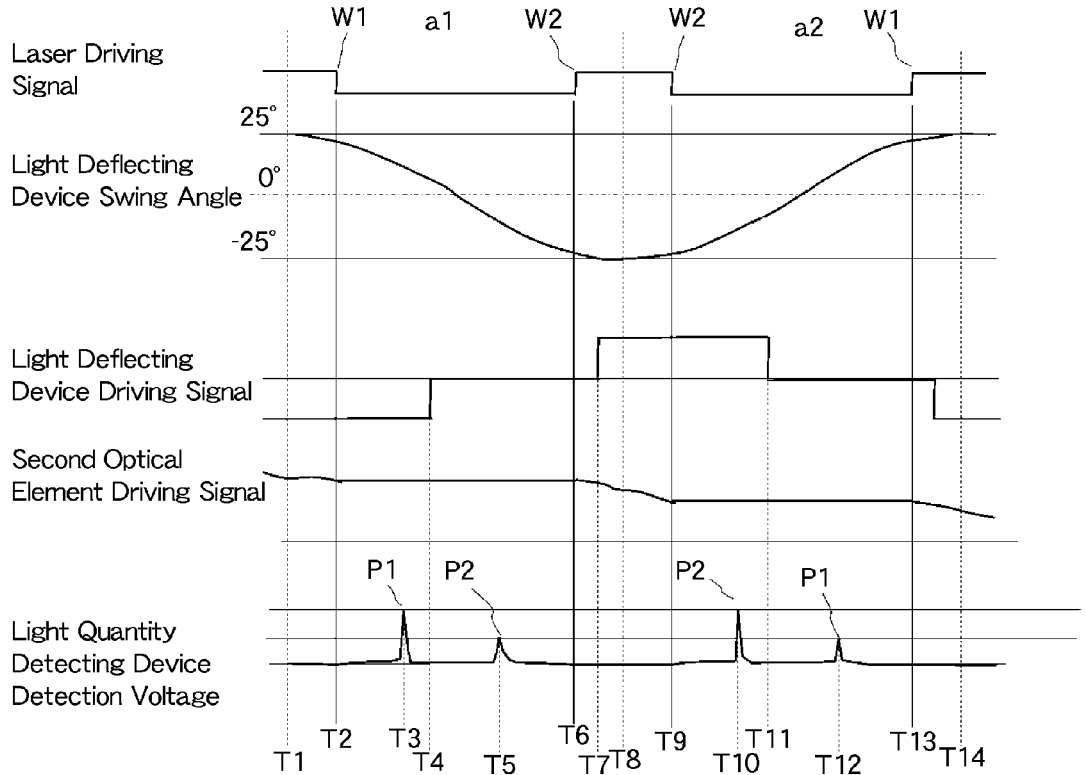
FIG. 7 is a time chart illustrating a temporal relation among laser light emission timing, oscillation timing of the oscillating mirror, a swing angle of the oscillating mirror, and focus change timing of the varifocal lens, and the fluctuation in light quantity detection voltage of a light beam sensor in the embodiment of the present invention.

In this embodiment, an electric field of 120 V acts between the electrodes 53, 55 so that the mirror part 5a oscillates in a sine wave at 20 kHz as illustrated in FIG. 5. For the application of the voltages to the electrodes, a method of applying positive and negative voltages as illustrated in FIG. 7, voltage application of only positive polarity, a method of changing the voltage in an analog manner, a method of performing PWM modulation or the like can be selected according to the electrode configuration. Note that the oscillating mirror 5 is preferably feed-back controlled because its mechanical natural frequency changes depending on temperature.

Figure 8:
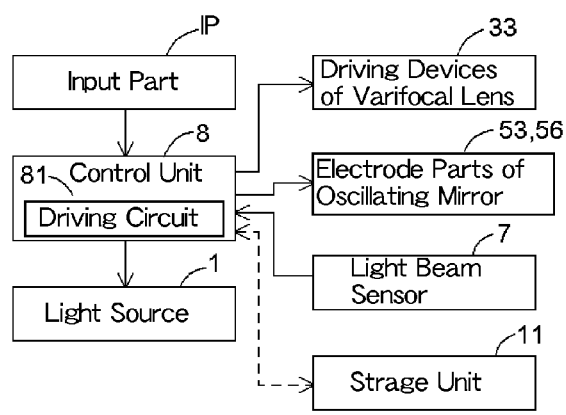
FIG. 8 is a block diagram of a control system of the light scanning unit according to the embodiment of the present invention.

The control unit 8 is composed of a micro-computer as an example, and the control unit 8 is connected to the light source 1, the driving devices 33 of the varifocal lens 3, the electrode parts 53, 56 of the oscillating mirror 5, the light beam sensor 7, and an input part IP as illustrated in FIG. 8. The input part IP is, for example, a part that outputs image data.

FIG. 7 is a time chart illustrating a mutual temporal relation among the laser light emission timing of the light source 1, the oscillation timing of the oscillating mirror 5, the swing angle of the oscillating mirror, and the focus change timing of the varifocal lens 3 by the control of the control unit 8, and the fluctuation in light quantity detection voltage of the light beam sensor 7. More specifically, when receiving input of a scan start command signal from the input part IP, the control unit 8 causes the light source 1 to emit laser light at a time point of T2 in FIG. 7, and outputs a driving signal to the driving devices 33 of the varifocal lens 3 using a light beam sensed signal from the light beam sensor 7 as the synchronization signal to change the thickness of the varifocal lens 3 via the driving devices 33 of the varifocal lens 3 in a predetermined period to thereby vary the focal distance. Then, the control unit 8 sequentially receives input of a light quantity sensed signal from the light beam sensor 7 and adjusts the output of the driving signal to the driving devices 33 of the varifocal lens 3 so that the light quantity of the reflection beam from the photosensitive drum 9 indicates the maximum value. Thus, the light beam scanning the photosensitive drum 9 has a focal position on the photosensitive drum 9 and has a uniform and minimum beam spot diameter. This state is the same as the state indicated as after making variable in FIG. 4.

Note that when there are a spot P1 and a spot P2 within a scanning region as in FIG. 3, the reflected light at the spot P1 becomes maximum when the focal point is at the position of a1 as illustrated in FIG. 7. When the focal point is at the position of a2, the reflected light at the spot P2 at a focal distance of the position of a2 becomes maximum. Measuring the reflected light while sequentially varying the focal position of the varifocal lens 3D as described above makes it possible to recognize that a reflection object (plane to be scanned) exists at a position where the reflected light at each position becomes maximum.

A light beam sensor 7D being a light quantity detecting device can be arranged near the oscillating mirror 5D but may use regularly reflected light that is reflected off the object and reflected in the same direction as that of the incident light. In this case, the reflected light can be made not to be affected by outside light due to retuning in the light source direction by the oscillating mirror 5D.

In the scanning by the oscillating mirror 5D, the beam diameter becomes minimum at positions in an arc shape centering the oscillating mirror 5D as illustrated in FIG. 3. Changing the voltage to the varifocal lens 3D according to the scan angle here can make the focal position into a straight line within a measurement target region (see after making variable in FIG. 4).

Since employing the configuration as illustrated in FIG. 3 makes it possible to take a focal position on a plane, the configuration is also applicable to reading barcodes and the like.

Figure 9:
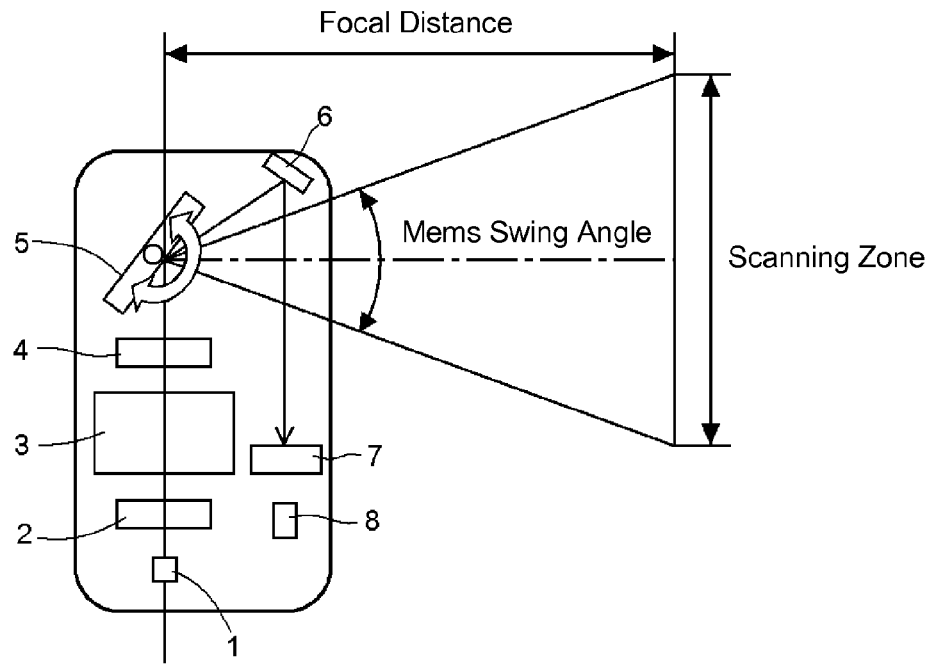
FIG. 9 is a diagram illustrating performance verification conditions of the light scanning unit in an example of the present invention.

For the laser scanning unit 10 according to this embodiment, performance verification was performed for the case where the focal distance of the oscillating mirror 5 was 200 mm, the lateral or vertical swing angle of the oscillating mirror 5 was 53 degrees (±26.5 degrees), and the scanning is zone on the plane to be scanned was 200 mm as illustrated in FIG. 9. Note that the focal distance of the oscillating mirror 5 means the shortest distance from the point of the oscillating mirror 5 where the light beam is reflected, namely, from the center of oscillation to the photosensitive drum 9.

Figure 10:
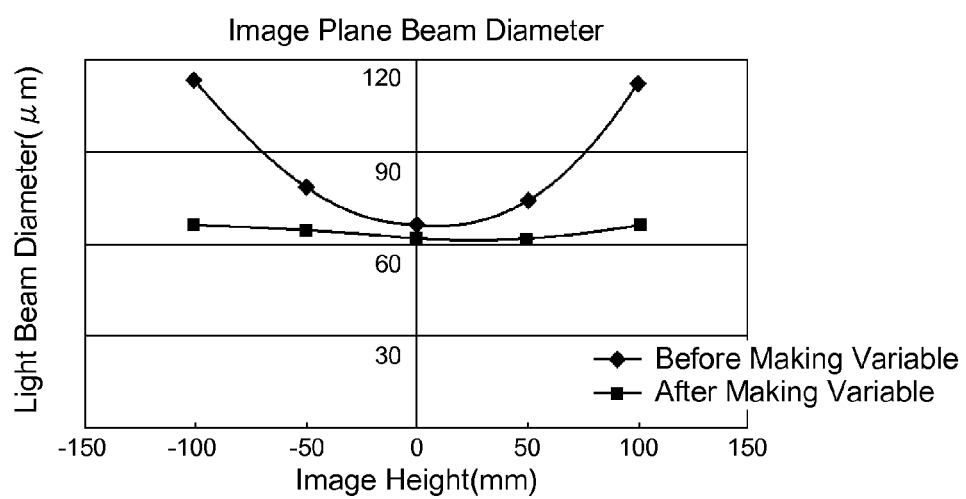
FIG. 10 is a graph illustrating results of the performance verification in FIG. 9.

The result of the verification is as illustrated in the graph of FIG. 10. More specifically, it is shown that before the focal distance of the oscillating mirror 5 is made variable, the light beam diameter on an image plane is minimum such as about 65 μm when an image height is 0 mm (center of the swing angle), whereas the light beam diameter gradually increases on both of a side where the image height is lower than 0 mm (for example, when swinging leftward) and a side where the image height is higher than 0 mm (for example, when swinging rightward) to reach 110 μm at maximum. In short, the light beam spot diameter increases as the scan position goes closer to both ends of the scanning zone of the plane to be scanned. Accordingly, the quality of the image to be formed on the plane to be scanned (photosensitive drum) 9 degrades.

In contrast, it is shown that after the focal distance of the oscillating mirror 5 is made variable, the light beam diameter less varies near 60 μm to be stable when the image height is 0 mm and on both of the sides where the image height is lower and higher than 0 mm. Namely, it was confirmed that sequentially varying the focal distance of the oscillating mirror 5 makes it possible to optimize the light beam diameter, in other words, to uniform and minimize the light beam spot diameter in the whole scanning zone of the plane to be scanned.

In the above-described verified laser scanning unit 10, the focal distance of the varifocal lens 3 has been adjusted so that the light beam has a uniform and minimum beam spot diameter on the plane to be scanned while the light source 1 is emitting the laser light in the whole range of the one-dimensional scanning by the oscillating mirror 5 and the oscillating mirror 5 is reflecting and scanning the light beam to the position of the photosensitive drum 9 being the plane to be scanned. When the laser scanning unit 10 is used as a writing system, the control unit 8 needs to perform control as follows. Namely, the control unit 8 performs control so that before image data is superposed on the laser light from the light source 1, only the laser light is emitted. Then, the control unit 8 controls a storage unit 11 to store the focal distance of the varifocal lens 3. In this event, the varifocal lens 3 has been adjusted so that the light beam has a uniform and minimum beam spot diameter on the plane to be scanned while the oscillating mirror 5 is scanning the light beam to the position of the photosensitive drum 9. Then, when the image data is superposed on the laser light to form an image on the photosensitive drum 9 being the plane to be scanned, the driving signal is supplied to the driving devices 31 of the varifocal lens 3 so as to obtain the focal distance stored in the storage unit 11. Note that the storage is preferably performed before shipping of the unit but may be performed by a person who purchases it.

Explaining the consecutive operations of the above-described laser scanning unit 10 referring to FIG. 1 and FIG. 9, the laser light of, for example, 780 nm emitted from the light source 1 is shaped into the parallel luminous flux with a beam diameter of 200 μm by the collimator lens 2. The light beam shaped into the parallel luminous flux by the collimator lens 2 passes through the varifocal lens 3 and the beam diameter correction lens 4 and is reflected off the oscillating mirror 5 and scanned in a straight line in the axial direction on the photosensitive drum 9. The photosensitive drum 9 is rotated in a direction of an arrow A in FIG. 1, whereby an electrostatic latent image is two-dimensionally formed on the surface of the photosensitive drum 9.

The laser light emission timing of the light source 1, the focus change timing of the varifocal lens 3, the oscillation timing of the oscillating mirror 5, the temporal relation of the swing angle of the oscillating mirror 5, and the fluctuation in light quantity detection voltage of the light beam sensor, is in the laser scanning unit according to the above embodiment are as exemplified in FIG. 7.

The scan positions with respect to the surface of the photosensitive drum 9 by the oscillating mirror 5 are different depending on the position on the scan line, namely, the image height, and different in focal distance. Here, the control unit 8 performs control to apply a voltage according to the image height to the varifocal lens 3 so as to focus it on all positions of the image height. Note that when the varifocal lens 3 and the oscillating mirror 5 are arranged apart from each other, a large difference occurs in diameter of beam applied to the oscillating mirror 5 due to the power of the varifocal lens 3 to cause distortion in the light beam shape on the surface of the photosensitive drum 9. For this reason, it is desirable to arrange the beam diameter correction lens 4 between the varifocal lens 3 and the oscillating mirror 5. However, the beam diameter correction lens 4 may be omitted in the case where the problem does not arise, or depending on the specifications.

The position of the image height in this example can be decided by the half mirror 6 being a light beam reflecting device provided at the end portion of the scanning region by the oscillating mirror 5, and by the light beam detector 7.

As described above, according to the embodiment of the present invention, the varifocal lens 3 automatically varies the focal distance to decide the focal position so that the scanning light beam has a uniform and minimum beam spot diameter on the photosensitive drum 9 being the plane to be scanned regardless of the distance from the oscillating mirror 5 to the photosensitive drum 9 being the plane to be scanned. Therefore, in the case of the writing system, even if an image forming medium such as a sheet of paper is, for example, either of an A4 size or an A3 size, one light scanning unit having a fixed focal distance can be used. Namely, when the size of the image forming medium to be used is changed between the A4 side and the is A3 size, it is necessary to move and adjust its internal optical system in a conventional unit, but the unit according to the embodiment of the present invention can cope with the case only by changing the swing angle.

In the above-described embodiment of the present invention, using the varifocal lens 3 makes it possible to converge the light beam at a predetermined position without using a long lens with a scanning region width on the downstream side of the light deflecting device. Further, the distance between the oscillating mirror 5 and the convergence position of the light beam can be arbitrarily set.

The oscillating mirror 5 performs one-dimensional scanning, and the detection signal of the reflected light from the photosensitive drum 9 arranged at the convergence position of the light beam is the synchronization signal accompanying the scanning by the oscillating mirror 5. Therefore, it is possible to form an electrostatic latent image focused on the photosensitive drum 9 without using a scanning lens such as an fθ lens or an arcsine lens between the oscillating mirror 5 and the photosensitive drum 9. Further, by detecting the focused reflected light, it is possible to obtain a synchronization signal with high precision and obtain an extremely high-quality image. The detection position of the focused reflected light may be a position other than the surface of the photosensitive drum and, for example, a reflecting device may be provided outside the irradiation region of the laser light to the photosensitive drum so as to focus the reflected light on the detecting device.

In the case where the convergence position of the scanning beam is changed only by the oscillating mirror 5 converging the scanning beam at a predetermined position, a large difference occurs in beam diameter on a light deflecting surface between the case where the distance to the convergence position is short and the case where the distance to the convergence position is long, thereby causing distortion in the light beam at the convergence position. Here, by correcting the light beam shape on the light deflecting surface by arranging the beam diameter correction lens 4 at a position near is the oscillating mirror 5, the distortion of the light beam at the scanning convergence position can be dissolved.

The laser scanning unit 10 according to the embodiment of the present invention can be used for a light scanning unit that is used in an image forming apparatus of an electrographic method and is additionally applicable to a barcode reader of a light scanning type, a laser radar apparatus for vehicle, or to an image forming apparatus such as a multifunctional machine of them. Further, using the oscillating mirror 5 of MEMS as the light deflecting device enables downsizing, reduction in noise, reduction in power consumption and thereby enables use of a laser printer, a digital copying machine, a laser plotter, a laser facsimile machine and so on in fields in which they have not been used before.

Distance Measuring Apparatus

The light scanning unit using the oscillating mirror 5 performing one-dimensional scanning as the light deflecting device has been described above, but use of an oscillating mirror performing two-dimensional scanning makes it possible to apply the above-described light scanning method according to the present invention to a distance measuring method. A distance measuring apparatus for using the distance measuring method can be configured by including an oscillating mirror 5B performing two-dimensional scanning exemplified in FIG. 11 and a control unit 8B exemplified in FIG. 12 in place of the oscillating mirror 5 and the control unit 8 of the light scanning unit in FIG. 1.

Figure 11:
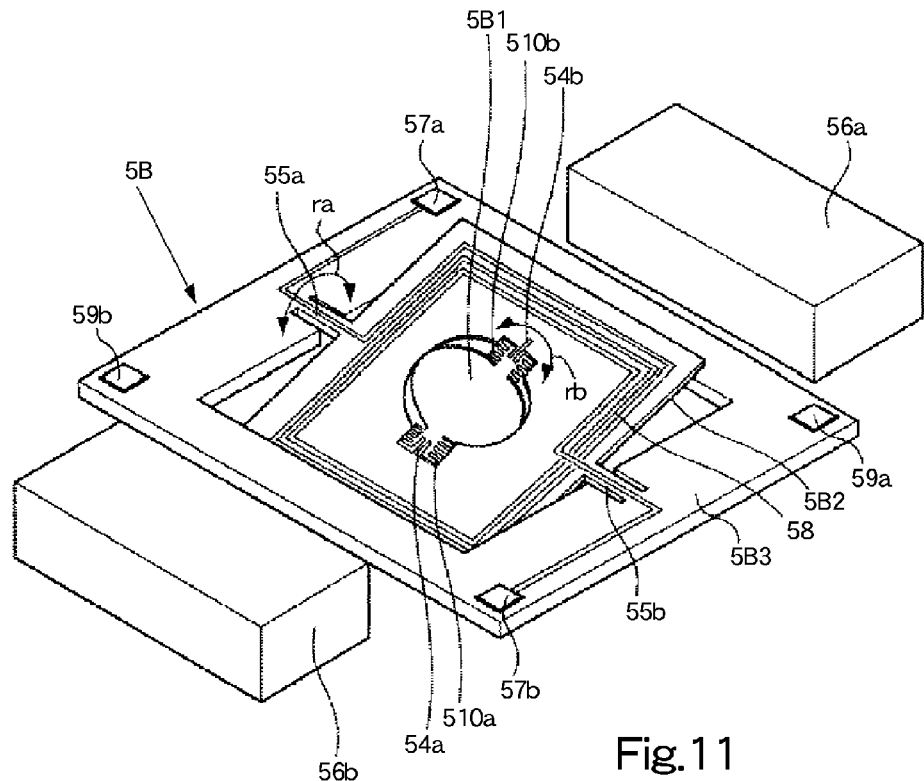
FIG. 11 is a perspective view illustrating an example of a two-dimensional scanning oscillating mirror.

FIG. 11 illustrates the oscillating mirror 5B cited from Japanese Patent Application Laid-Open No. 2007-333812 as an example of the oscillating mirror of the MEMS type performing two-dimensional scanning suitable for the distance measuring apparatus. The oscillating mirror 5B has a scanning mirror part 5B1 that is oscillated around a first axis and a second axis perpendicular to each other. More specifically, the oscillating mirror 5B is provided with the scanning mirror part 5B1 that reflects a light beam, an is inside frame part 5B2, for example, in a rectangular shape that supports the scanning mirror part 5B1, an outside frame part 5B3, for example, in a rectangular shape that supports the inside frame part 5B2. The scanning mirror part 5B1 is supported on the inside frame part 5B2 by a pair of primary twisting bars 54a and 54b that exist on a common straight line. Further, the inside frame part 5B2 is supported on the outside frame part 5B3 by a pair of secondary twisting bars 55a and 55b having a vibration axis in a direction substantially perpendicular to a vibration axis of the primary twisting bars 54a and 54b.

With the above configuration, the scanning mirror part 5B1 and the inside frame part 5B2 oscillate around the axes perpendicular to each other. Further, the axis around which the scanning mirror part 5B1 oscillates is the primary axis and the axis around which the inside frame part 5B2 oscillates is the secondary axis. Further, the configuration in this example is made such that the primary twisting bars 54a and 54b are driven by the electrostatic force and the secondary twisting bars 55a and 55b are driven by the electromagnetic force. In the configuration in this example, electromagnetic driving magnets 56a and 56b are arranged in a manner to hold the outside frame part 5B3 between them in the direction (direction in which the primary axis extends) perpendicular to the direction in which the secondary twisting bars 55a and 55b face each other.

The primary twisting bars 54a and 54b and the secondary twisting bars 55a and 55b are members having predetermined elastic force so as to twist members held in between right and left by a certain angle, and each of the members may be integrally formed with the scanning mirror part 5B1 and the inside frame part 5B2, or the inside frame part 5B2 and the outside frame part 5B3.

Near corner portions on a diagonal line of the outside frame part 5B3, secondary axis electrodes 57a and 57b are provided. A wiring part led out from the secondary axis electrode 57a is laid at an outer peripheral is portion of the inside frame part 5B2 via the secondary twisting bar 55a, formed into a pattern in a coil shape of several turns along the periphery, and thereby configured as a secondary axis electromagnetic driving coil 58. The terminal end of the coil 58 is connected to the secondary axis electrode 57b via the secondary twisting bar 55b.

With the above configuration, when an AC voltage with a driving frequency of, for example, 60 Hz is applied to the secondary axis electrodes 57a and 57b, an electromagnetic force is generated to cause a twisting operation of the secondary twisting bars 55a and 55b, so that the inside frame part 5B2 (scanning mirror part 5B1) oscillates in a direction of an arrow ra. In this case, the oscillation method of the secondary twisting bars 55a, 55b is non-resonant and the oscillation waveform is in a saw-tooth wave shape.

On the other hand, near corner portions of the outside frame part 5B3 on another diagonal line crossing the diagonal line on which the secondary axis electrodes 57a and 57b are provided, primary axis electrodes 59a and 59b are provided. From the primary axis electrodes 59a and 59b, wiring parts are formed passing on the rear surface side of the outside frame part 5B3 and connected, for example, via the secondary twisting bars 55a and 55b to electrostatic driving electrodes 510a and 510b, for example, in a comb-teeth shape which face the primary twisting bars 54a and 54b of the inside frame part 5B2 via small gaps. By providing comb-teeth projections with the same pitch as those of the electrostatic driving electrodes 510a and 510b also on both sides of the primary twisting bars 54a and 54b and engaging their comb teeth with each other via small gaps, the electrostatic capacity can be made larger.

In the above configuration, by applying an AC voltage with a frequency substantially coincident with the resonant frequency of the scanning mirror part 5B1, for example, of about 18 kHz between the primary axis electrodes 59a and 59b, the scanning mirror part 5B1 is electrostatically driven. In this event, the scanning mirror part 5B1 vibrates at a high speed in is a direction of an arrow rb by the twisting operation of the primary twisting bars 54a and 54b. The driving method of the primary twisting bars (primary axis) 54a and 54b is electrostatic, the vibration method is resonant, and the vibration waveform is a sine wave.

As for the material, the scanning mirror part 5B1 can be formed of a semiconductor film made by selectively removing a holding substrate and an oxide layer from an SOI (Silicon On Insulator) substrate in which the oxide layer such as a silicon dioxide (SiO2) and the semiconductor film such as silicon are stacked in order on the surface of the holding substrate formed, for example, of silicon. The flat surface of the semiconductor film is used as the scanning mirror part 5B1 being the incident surface of light. On the flat surface of the scanning mirror part 5B1, for example, a reflection film, for example, of aluminum (Al) or gold (Au) may be formed in order to increase the reflectance.

Figure 12:
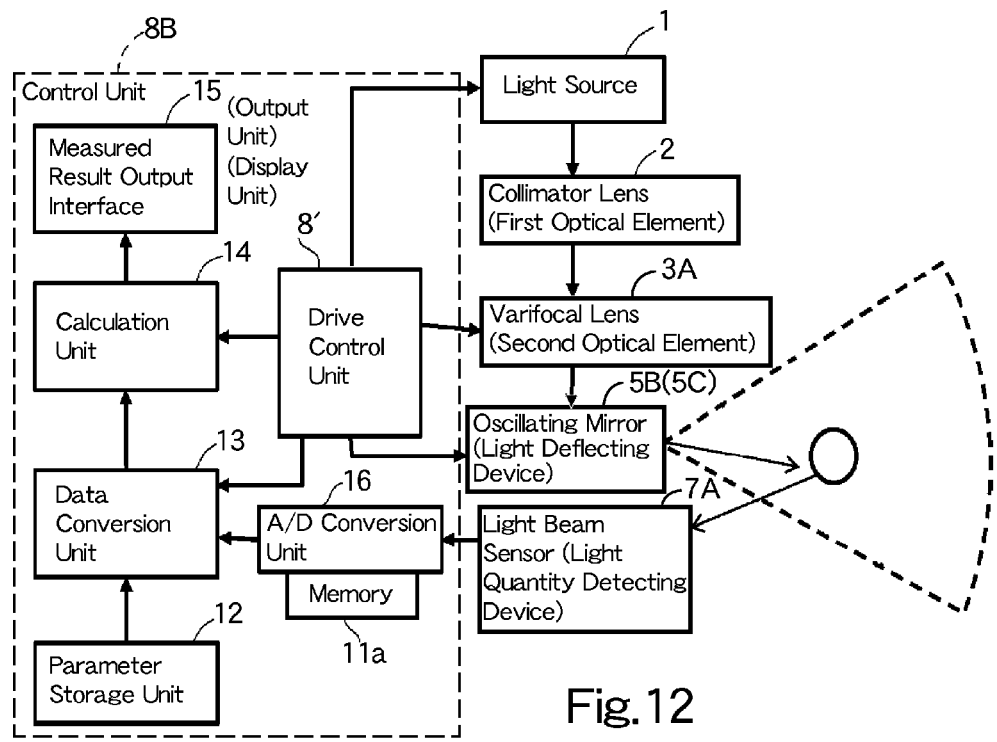
FIG. 12 is a block diagram of a control system of a distance measuring apparatus according to an application of the present invention.
Figure 13:
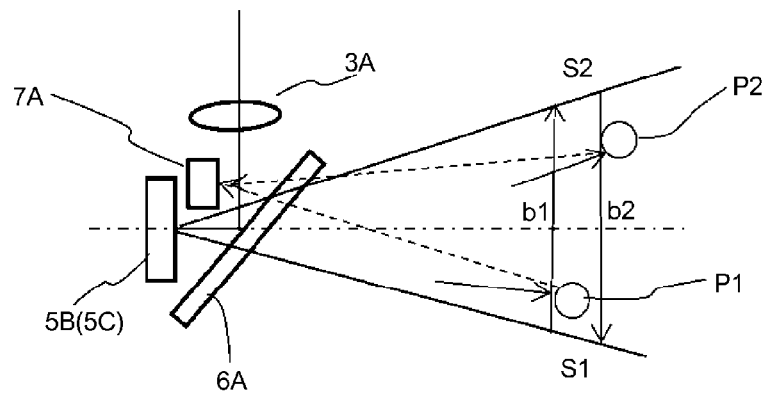
FIG. 13 is a view explaining a principle of distance measurement using the varifocal lens.

The control unit 8B being one example of the control unit 8 is made to have a configuration illustrated in FIG. 12, and its configuration around the oscillating mirror 5B (5C) is illustrated in FIG. 13. FIG. 13 is the same as above-described FIG. 3 but is different in that the varifocal lens 3D operates. As illustrated in FIG. 12, the control unit 8B has: a drive control unit 8F that controls driving of a light source 1 that emits laser, a varifocal lens 3D being a second optical element, and an oscillating mirror 5B or 5C being a light deflecting device; an A/D conversion unit 16 that converts the detection voltage from a light beam sensor 7D being a light quantity detecting device from analog to digital; a parameter storage unit 12 that stores two-dimensional positional information; a data conversion unit 13 that converts an output value from the A/D conversion unit 16 to detection voltage value information (reflection intensity) at a position on the basis of the two-dimensional positional information stored in the parameter storage unit 12; a calculation unit 14 that extracts a position where the detection voltage value becomes maximum at a calculation timing designated by the drive control unit 8F; and a measured result output interface 15 for outputting a measured result to a display unit or the like.

Figure 14:
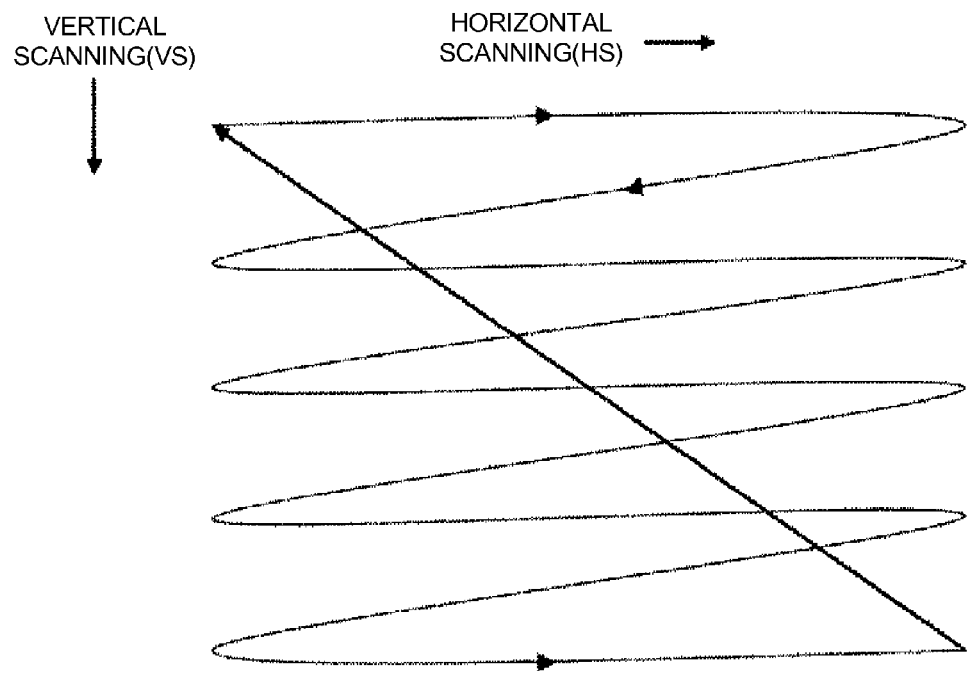
FIG. 14 is a drawing illustrating a scanning pattern of the oscillating mirror in FIG. 12.

The drive control unit 8F causes the oscillating mirror 5B or 5C to repeatedly perform horizontal scanning and vertical scanning by one scanning in a predetermined range as illustrated in FIG. 14 and return to the starting point after the one scanning is finished. The timings by the drive control unit 8F are the same as those in the example of FIG. 7, and description thereof will be omitted.

Then, the reflected light from the object is detected as an analog quantity by the light beam sensor 7D being a light quantity detecting device, and converted into a digital signal by the A/D conversion unit 16. In the data conversion unit 13, information obtained by associating the detected value from the light beam sensor 7D, the two-dimensional positional information stored in the parameter storage unit 12, and focal position information (positional information in a depth direction) relating to the voltage applied to the varifocal lens 3D being a second optical element, is converted into three-dimensional information. Then, a position where the reflection intensity becomes maximum is extracted in the calculation unit 14 and outputted in a predetermined output format or as a display image from the measured result output interface unit 15.

Figure 15:
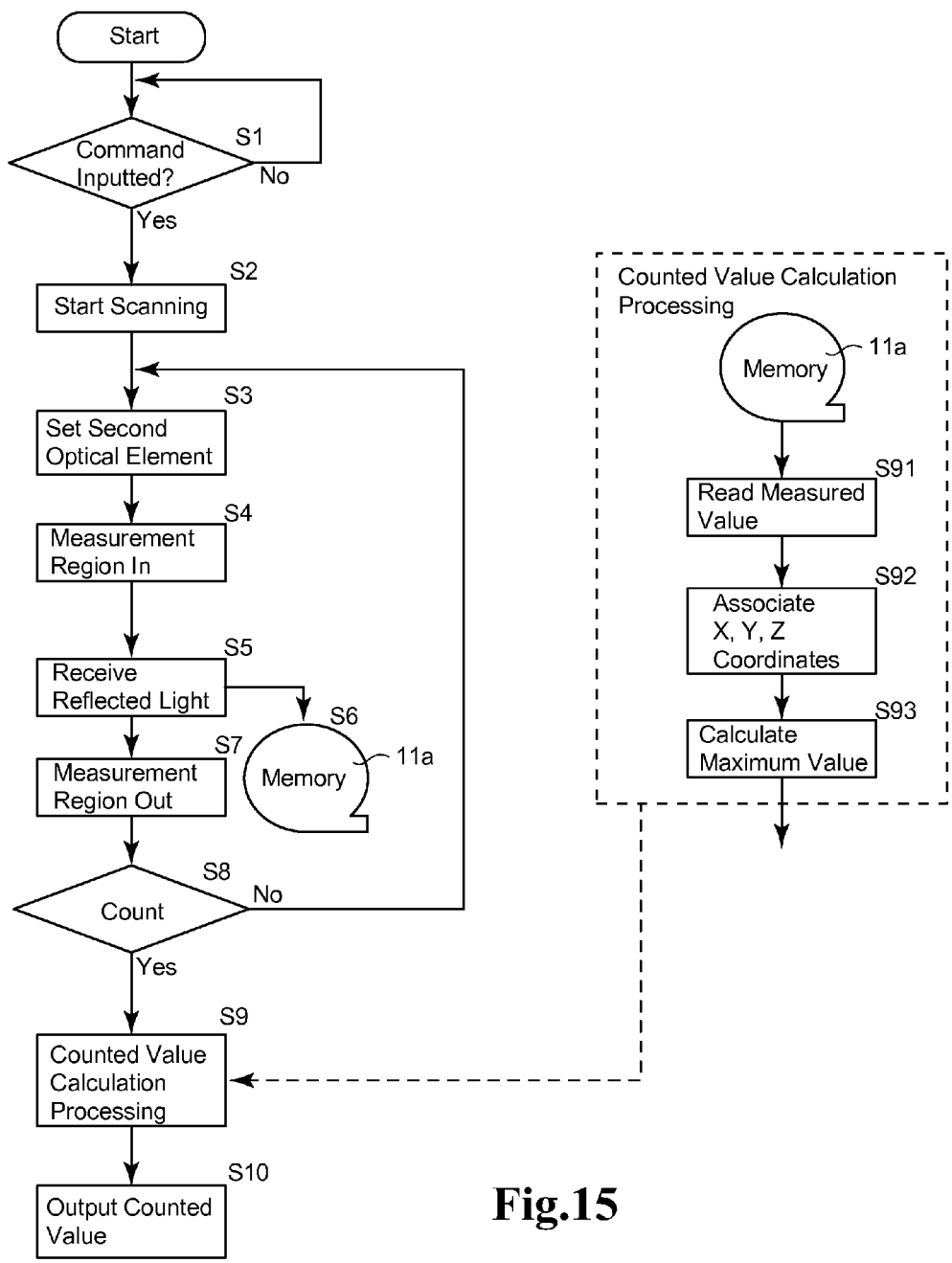
FIG. 15 is a flowchart explaining the flow of the operation of the distance measuring apparatus according to the application of the present invention.

FIG. 15 is a flowchart illustrating the flow of the operation of the above-described distance measuring apparatus.

When a command signal is inputted into the control unit 8B (at the time when Yes at Step 1. Hereinafter, Step is expressed as S), scanning is started (S2), and a focal distance change range (distance measurement region) with respect to the varifocal lens 3, namely, a minimum focal distance and a maximum focal distance are set (S3). Subsequently, after the focal distance change range with respect to the varifocal lens 3 is set, the minimum focal distance in the focal distance change range is set (S4), the reflected light from the plane to be scanned or the reflected light from a half mirror 6D is is received by the light beam sensor 7D being a light detecting device (S5), the light quantity (received light intensity) is measured, and the measured value is recorded in a memory 11a (S6).

After the reflected light is received, a focal distance one larger than the minimum focal distance in the focal distance change range is set (S7), and whether or not a counted value of a counter that counts the number of times of focal distance change has reached a predetermined value is judged (S8). The processing of S3 to S8 is repeated until the counted value of the counter reaches the predetermined value. Then, when the counted value of the counter reaches the predetermined value, counted value calculation processing is performed (S9).

The counted value calculation processing is performed by the data conversion unit 13 and the calculation unit 14. In the counted value calculation processing, as illustrated within a dotted line on the right side in FIG. 15, a measured digital value is read from the memory 11a (S91), association processing of X, Y, Z coordinates (three-dimensional coordinates) is performed by the data conversion unit 13 (S92), and a maximum value is calculated (S93). Subsequently, the maximum value calculated in the counted value calculation processing is outputted as the counted value (S10).

Here, the maximum value of the light quantity of the reflected light (received light) means that the set focal distance coincides with the distance to a position to be scanned of a distance object. Accordingly, a series of outputted counted values indicate the two-dimensional shape (asperities on the scan line) of the object to be measured when the oscillating mirror 5B or 5C one-dimensionally oscillates, and indicate the three-dimensional shape of the object to be measured when the oscillating mirror 5B or 5C two-dimensionally oscillates.

The scanning beam deflected and scanned by the oscillating mirror 5B or 5C is controlled to sequentially become longer in focal distance is by the varifocal lens 3D. Here, a regular reflection component of the reflected light of the scanning light is guided by the oscillating mirror 5B or 5C and by the half mirror 6D provided on the downstream side of the collimator lens 2 into the light beam detector 7D, and detected as the reflected light quantity.

For example, when the scanning beam is applied on a hand, reflected light with the shortest focal distance, namely, at a tip end portion of the hand is sensed as the strongest light, and reflected light at a longer focal distance is sequentially detected as the position of the hand and a human body. Though the resolution is set to be 1 cm so as to enable measurement in the depth direction at 60 cm per second in this application, the resolution of detection can be arbitrarily set by the resolution of the focal distance and the scanning speed of the varifocal lens 3D. Further, the resolution may be switched depending on detection of a material body.

Since the resolution and precision of detection can be set by the resolution and the scanning speed of the varifocal lens in this application as described above, measurement of a short distance that is difficult in the conventional method of measuring the time of reflected light can be performed at a low cost. Further, arbitrarily setting the scanning width makes it possible to perform setting according to the usage from a range of a short distance and a wide angle to a range of a long distance and a narrow angle.

The laser scanning unit according to the embodiment of the present invention and the distance measuring apparatus being its application have been described above, and can be variously implemented without departing from the scope of the present invention. For example, the light emitted from the varifocal lens may be directly oscillated without providing the oscillating mirror 5 and so on. Further, the light beam is laser light but may be other light depending on the kind of the plane to be scanned.

Further, the spot diameter of the beam light converged on the plane to be scanned is preferably made minimum, but when it is difficult to uniform the spot diameter depending on positions, the spot diameter may be a diameter slightly larger than the minimum diameter for uniformity. Further, the collimator lens is employed as the first optical element, but the collimator lens may be omitted or a lens that converts light not to complete collimated light but to almost collimated light may be employed.

The invention claimed is:

1. A light scanning unit for scanning a light beam emitted from a light source on a plane to be scanned, the light scanning unit comprising:
   an optical element that converges light emitted from the light source onto the plane to be scanned;
   a device that sequentially varies a focal distance of the optical element to uniform a beam spot diameter at each position on the plane to be scanned where a distance from the light source varies;
   a light beam sensing device that senses the light beam whose focal distance is decided by the second optical element and which is scanned on the plane to be scanned by the light deflecting device;
   a light quantity detecting device that detects a light quantity of the light beam scanned on the plane to be scanned by the light deflecting device or the light beam reflected off the plane to be scanned; and
   a control unit that uses a sensed signal of the light beam sensing device as a synchronization signal of the light deflecting device and controls a focal distance adjusting function of the second optical element to make the light quantity of the reflected light beam detected by the light quantity detecting device have a maximum value;
   where the optical element comprises:
      a first optical element that converts laser light emitted from the light source to collimated light with a predetermined light diameter; and
      a second optical element that varies the focal distance of the light beam incident thereon from the first optical element, and
      wherein the light scanning unit further comprises a light deflecting device that reflects the light beam from the second optical element and applies the light beam to the plane to be scanned
   wherein the first optical element is a collimator lens,
   wherein the second optical element is a varifocal lens,
   wherein the light deflecting device is an oscillating mirror, and
   wherein the light scanning unit further comprises a half mirror that reflects the light beam from the collimator lens to the oscillating mirror, transmits the light beam from the oscillating mirror to the plane to be scanned, and transmits the light beam reflected off the plane to be scanned to the light quantity detecting device.

2. The light scanning unit according to claim 1, wherein the oscillating mirror is a MEMS mirror manufactured by micromachining and is formed in a microminiature oscillating mirror module.

* * * * *